US008060633B2

(12) United States Patent
Zhang et al.

(10) Patent No.: US 8,060,633 B2
(45) Date of Patent: Nov. 15, 2011

(54) METHOD AND APPARATUS FOR IDENTIFYING DATA CONTENT

(75) Inventors: Zhiqun Zhang, Hangzhou (CN); Huaqiang Hu, Hangzhou (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 287 days.

(21) Appl. No.: 12/347,534

(22) Filed: Dec. 31, 2008

(65) Prior Publication Data

US 2009/0138471 A1 May 28, 2009

Related U.S. Application Data

(63) Continuation of application No. PCT/CN2007/071119, filed on Nov. 23, 2007.

(30) Foreign Application Priority Data

| Nov. 24, 2006 | (CN) | 2006 1 0144950 |
| Feb. 16, 2007 | (CN) | 2007 1 0064023 |
| May 29, 2007 | (CN) | 2007 1 0106017 |

(51) Int. Cl.
*G06F 15/16* (2006.01)
*G06F 15/173* (2006.01)
(52) U.S. Cl. ........................ 709/230; 709/223
(58) Field of Classification Search .................. 709/203, 709/217, 219, 225, 229, 230
See application file for complete search history.

(56) References Cited

U.S. PATENT DOCUMENTS

| 5,509,006 | A * | 4/1996 | Wilford et al. ............... 370/401 |
| 6,493,761 | B1 * | 12/2002 | Baker et al. .................. 709/230 |
| 6,633,860 | B1 * | 10/2003 | Afek et al. .................... 706/45 |
| 7,248,168 | B2 * | 7/2007 | Muehl et al. ................ 340/572.4 |
| 7,633,944 | B1 * | 12/2009 | Chang et al. .................. 370/392 |
| 7,664,879 | B2 * | 2/2010 | Chan et al. ..................... 709/245 |
| 7,765,313 | B2 * | 7/2010 | Jain et al. ........................ 709/230 |
| 7,917,584 | B2 * | 3/2011 | Arthursson ..................... 709/205 |
| 2002/0116205 | A1 * | 8/2002 | Ankireddipally et al. ........ 705/1 |
| 2003/0126272 | A1 * | 7/2003 | Corl et al. ........................ 709/230 |
| 2003/0131116 | A1 * | 7/2003 | Jain et al. ........................ 709/230 |
| 2004/0030745 | A1 * | 2/2004 | Boucher et al. ............... 709/203 |

(Continued)

FOREIGN PATENT DOCUMENTS

CN 1450757 10/2003

(Continued)

OTHER PUBLICATIONS

International Search Report for Application No. PCT/CN2007/07119, dated Mar. 13, 2008.

*Primary Examiner* — Moustafa M Meky
*Assistant Examiner* — Sargon Nano
(74) *Attorney, Agent, or Firm* — Marshall, Gerstein & Borun LLP

(57) ABSTRACT

A method for identifying data content comprises: establishing a character base which stores characters corresponding to various service applications and protocols; performing matching between contents of currently received data and the characters in the character base, and obtaining characters contained in the currently received data; identifying at least one of a service application and a protocol corresponding to the characters contained in the currently received data according to a mapping relation between characters and protocols as well as a mapping relation between characters and service applications. An apparatus for identifying data content is also disclosed. The technical scheme of the present invention can identify data content comprehensively and can be easily extended.

28 Claims, 8 Drawing Sheets

U.S. PATENT DOCUMENTS

| | | | |
|---|---|---|---|
| 2004/0083299 A1* | 4/2004 | Dietz et al. | 709/230 |
| 2004/0165597 A1* | 8/2004 | Bicknell et al. | 370/395.31 |
| 2005/0286517 A1* | 12/2005 | Babbar et al. | 370/389 |
| 2007/0047270 A1* | 3/2007 | Makino et al. | 363/34 |
| 2007/0136463 A1* | 6/2007 | Guenther et al. | 709/224 |
| 2007/0244987 A1* | 10/2007 | Pedersen et al. | 709/217 |
| 2007/0282858 A1* | 12/2007 | Arner et al. | 707/10 |
| 2008/0002702 A1* | 1/2008 | Bajic et al. | 370/392 |
| 2009/0116398 A1* | 5/2009 | Shi et al. | 370/252 |

FOREIGN PATENT DOCUMENTS

| | | |
|---|---|---|
| CN | 1578227 A | 2/2005 |
| CN | 1614565 A | 5/2005 |
| CN | 1852297 A | 10/2006 |
| CN | 1968278 A | 5/2007 |
| CN | 101035131 A | 9/2007 |
| CN | 100345118 C | 10/2007 |
| CN | 101060492 A | 10/2007 |
| WO | WO 2008/061483 A1 | 5/2008 |

* cited by examiner (a)

(b)

METHOD AND APPARATUS FOR IDENTIFYING DATA CONTENT

CROSS-REFERENCE TO RELATED APPLICATIONS

This is a continuation of international Application No. PCT/CN2007/071119, filed Nov. 23, 2007, which claims the priority benefit of Chinese Patent Application No. 200610144950.7, filed Nov. 24, 2006; Chinese Patent Application No. 200710064023.9, filed Feb. 16, 2007; and Chinese Patent Application No. 200710106017.5, filed May 29, 2007, the entire respective disclosures of which are incorporated herein by reference.

FIELD OF THE INVENTION

The present invention relates to network communication technologies, and particularly, to a method and an apparatus for identifying data content.

BACKGROUND OF THE INVENTION

A multi-layer protocol stack structure is employed in the existing communication network. For example, four-layer protocol stack structure employed in TCP/IP network includes from top to button: an application layer, a transport layer, an internet layer and a link layer. Therefore, a packet transmitted in the existing communication network usually adopts a multi-layer protocol encapsulation format, i.e., protocol headers corresponding to multiple layer protocol stacks are encapsulated in turn outside of the payload of the packet.

Identifying data content includes identifying every layer protocol header of the packet and specific contents in the payload of the packet, or identifying contents of a data fragment in a data stream. According to identifying results, the method for identifying data content may be divided into two classes: one method is for identifying a protocol to which the data belongs; the other method is for identifying a service application of the data. The service application includes, except protocols, applications which can be identified from the contents of the data, such as an attack, virus, designated operation, etc. The method for identifying data content is applied abroad in various data processing devices in the communication network. For example, a bandwidth management device identifies the protocol to which the data content belongs, and further performs bandwidth restriction according to the protocol to which the data belongs. An Intrusion Detection System/Intrusion Prevention System (IDS/IPS) and some anti-virus products identify a service application of the data (attack, virus, etc.), and further perform resisting operation or give an alarm according to the identified service application.

However, in the prior art, identifying schemes for different protocols and service applications are different, and every data processing device identifies certain data content separately. For example, the bandwidth management device identifies the protocol to which the data belongs, while the anti-virus product identifies viruses in the data. Moreover, new identifying schemes need to be developed for newly extended protocols and service applications.

Therefore, in the prior art, the method for identifying data content has a single function and has no good scalability.

SUMMARY OF THE INVENTION

The present invention provides a method for identifying data content, which can identify data content comprehensively and has good scalability.

The present invention provides an apparatus for identifying data content, which can identify data content comprehensively and has good scalability.

To attain the above objectives, the technical scheme of the present invention is given as follows.

A method for identifying data content provided by the present invention includes:

establishing a character base, wherein the character base stores characters corresponding to various service applications and protocols;

performing matching between contents of currently received data and the characters in the character base, and obtaining characters contained in the currently received data;

identifying at least one of a service application and a protocol corresponding to the characters contained in the currently received data according to a mapping relation between characters and protocols as well as a mapping relation between characters and service applications.

An apparatus for identifying data content provided by the present invention includes a character base, a core identifying module and a content detecting module, wherein the character base is configured to store characters corresponding to various service applications and protocols;

the core identifying module is configured to send received data to the content detecting module, and identify at least one of a service application and a protocol corresponding to characters returned by the content detecting module according to a mapping relation between characters and protocols as well as a mapping relation between characters and service applications;

the content detecting module is configured to perform matching between contents of the received data from the core identifying module and the characters in the character base, obtain characters contained in the received data and return the characters contained in the received data to the core identifying module.

As can be seen from the above technical scheme, in the present invention, a character base is established for various service applications and protocols, characters contained in the currently received data are obtained by performing matching between contents of the currently received data and characters in the character base, and then a service application and/or protocol corresponding to the obtained character is identified. The technical scheme of the present invention can be applied in any environment needing to identify data content, such as protocol identification, attacking identification and virus identification. The technical scheme of the present invention not only can identify data content comprehensively but also has good scalability.

DETAILED DESCRIPTION OF THE INVENTION

Figure 1:
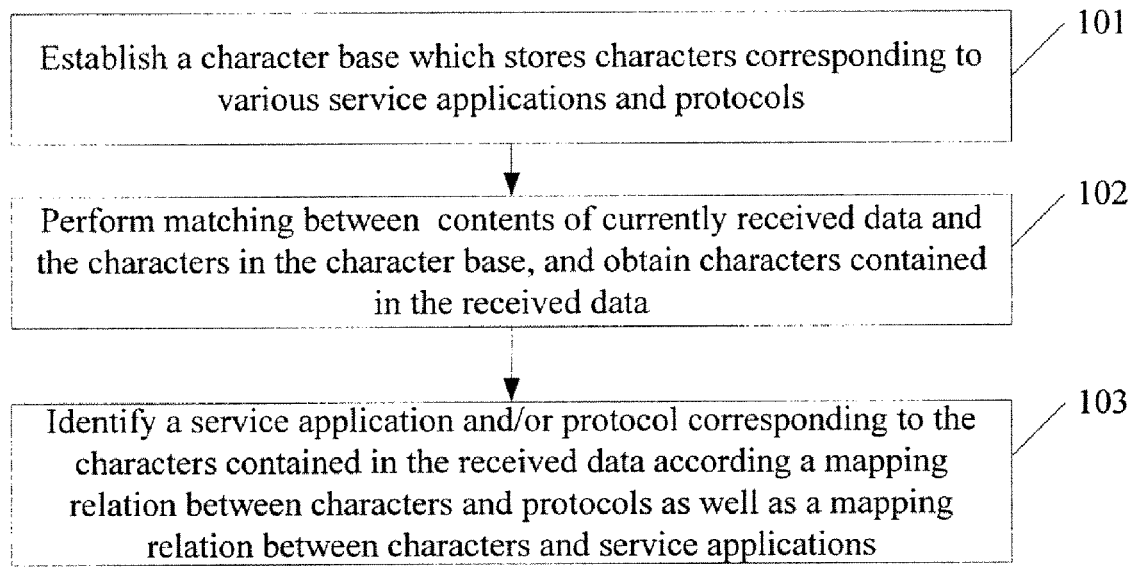
FIG. 1 is a schematic flowchart illustrating a method for identifying data content according to an embodiment of the present invention.

FIG. 1 is a schematic flowchart illustrating a method for identifying data content according to the present invention. As shown in FIG. 1, the method includes the following processes.

Block 101: A character base which stores characters corresponding to various service applications and protocols is established.

In the process, the service applications includes, except for protocols, all applications which can be identified from the data content, such as attacks, viruses, bugs, etc.

Block 102: Matching between currently received data and the characters in the character base is performed, and characters contained in the received data are obtained.

Block 103: A service application and/or protocol corresponding to the obtained characters are identified according to the mapping relation between characters and protocols as well as the mapping relation between characters and service applications.

Since in the above method shown in FIG. 1, a character base is established for various service applications and protocols, the protocol to which the currently received data and/or service application of the currently received data can be identified, and then a process is performed according to the identified protocol and service application, such as bandwidth restriction, risk prevention, alarm, etc. Therefore, the method shown in FIG. 1 can be applied in the environments, such as bandwidth restriction after identifying the protocol to which the data belongs, and risk prevention after identifying risks in the data, and has widely applicability.

Figure 2:
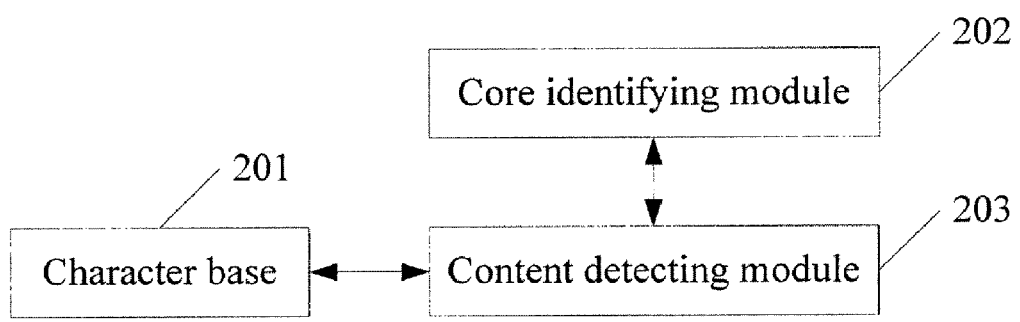
FIG. 2 is a schematic structure diagram illustrating an apparatus for identifying data content according to an embodiment of the present invention.

FIG. 2 is a schematic structure diagram illustrating an apparatus for identifying data content according to the present invention. As shown in FIG. 2, the apparatus comprises a character base 201, a core identifying module 202 and a content detecting module 203.

The character base 201 is configured to store characters corresponding to various service applications and protocols.

The core identifying module 202 is configured to send the received data to the content detecting module 203, and identify a service application and/or protocol corresponding to characters returned from the content detecting module 203 according to the mapping relation between characters and protocols as well as the mapping relation between characters and service applications.

The content detecting module 203 is configured to perform matching between contents of the received data from the core identifying module 202 and the characters in the character base 202, obtain the characters contained in the received data and return the characters to the core identifying module 202.

In the embodiments of the present invention, in order to combine the protocol identification and service application identification together, all of specific protocols, specific actions of a protocol, attacks and viruses may be described and indicated by characters contained in the header and payload of a packet. Herein, the characters indicate data modes and one character stands for one data mode. For example, a Bit Torrent (BT) protocol may be described by a data mode (i.e. character) of "\13Bittorent protocol". The character base is a set including characters such as attacks, protocols, specific actions of a protocol, viruses, etc. Every attack, protocol, specific action of a protocol or virus corresponds to one or more than one character, and the character is preset.

Figure 3:
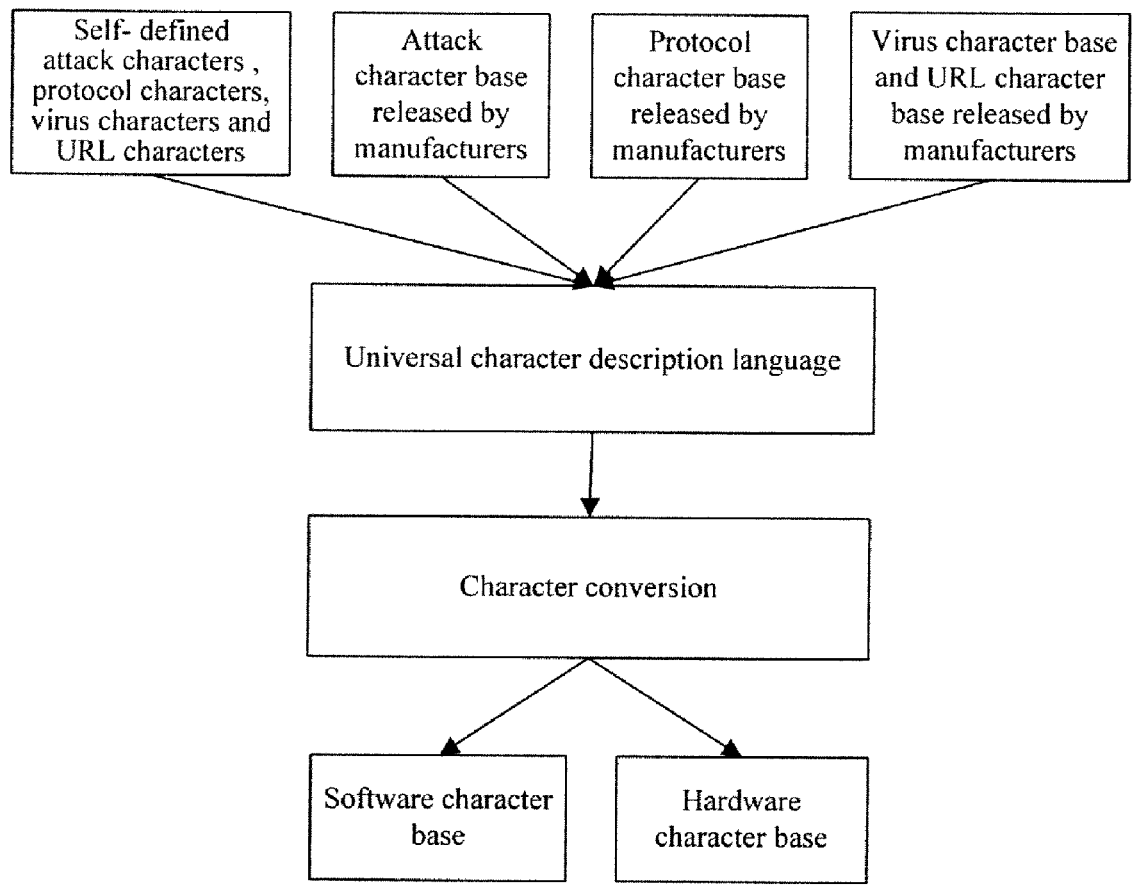
FIG. 3 is a schematic diagram illustrating the implementation of a character base according to an embodiment of the present invention.

FIG. 3 is a schematic diagram illustrating the implementation of a character base according to the present invention. As shown in FIG. 3, representative character bases are as follows.

An attack character base is used when it is needed to identify security risks such as backdoors, bugs, attacks, viruses, etc, and is usually released periodically by manufacturers.

A protocol character base; some protocols can not be identified by the identifying mode of a fixed port, e.g., a well-known protocol being not at a well-known port can not be identified by the identifying mode of the fixed port. Therefore, it is needed to combine characters contained in the header and payload of the data together to identify the protocol. Generally, the protocol character base is often updated by manufacturers.

A virus character base is used when it is needed to identify viruses with specific characters.

A Uniform Resource Locator (URL) character base is used when it is needed to filter data according to a specific URL.

In a possible situation, users should be allowed to self-define character bases but not limited to the above character bases. The self-defined character bases are external sources of character bases.

There are various sources of character bases, but the character bases are essentially described with characters in the header and payload of a packet and each object in a character base may be described by a universal language such as text. When contents are searched by software or hardware, i.e., matching between contents of the received data and characters in the character base is performed, the formats of character base, required by the hardware of different manufacturers and different software searching algorithms, are different. In addition, some manufactures do not disclose their character formats of the hardware. Therefore, it is possible to convert the universal character description language adopting the text format into a language adopting a format which can be identified by the applied software or hardware according to the applied software searching algorithm and hardware used to search.

Matching between the characters in the character bases shown in FIG. 3 and the protocol characters, virus characters, attack characters or URL characters contained in the packet is performed, and various complicated protocols and service applications can be identified. Therefore, the identification method can be widely applied and can improve overall system performance.

This invention is hereinafter further described in detail with reference to the accompanying drawings and embodiments so as to make the objective, technical solution and merits thereof more apparent.

Figure 4:
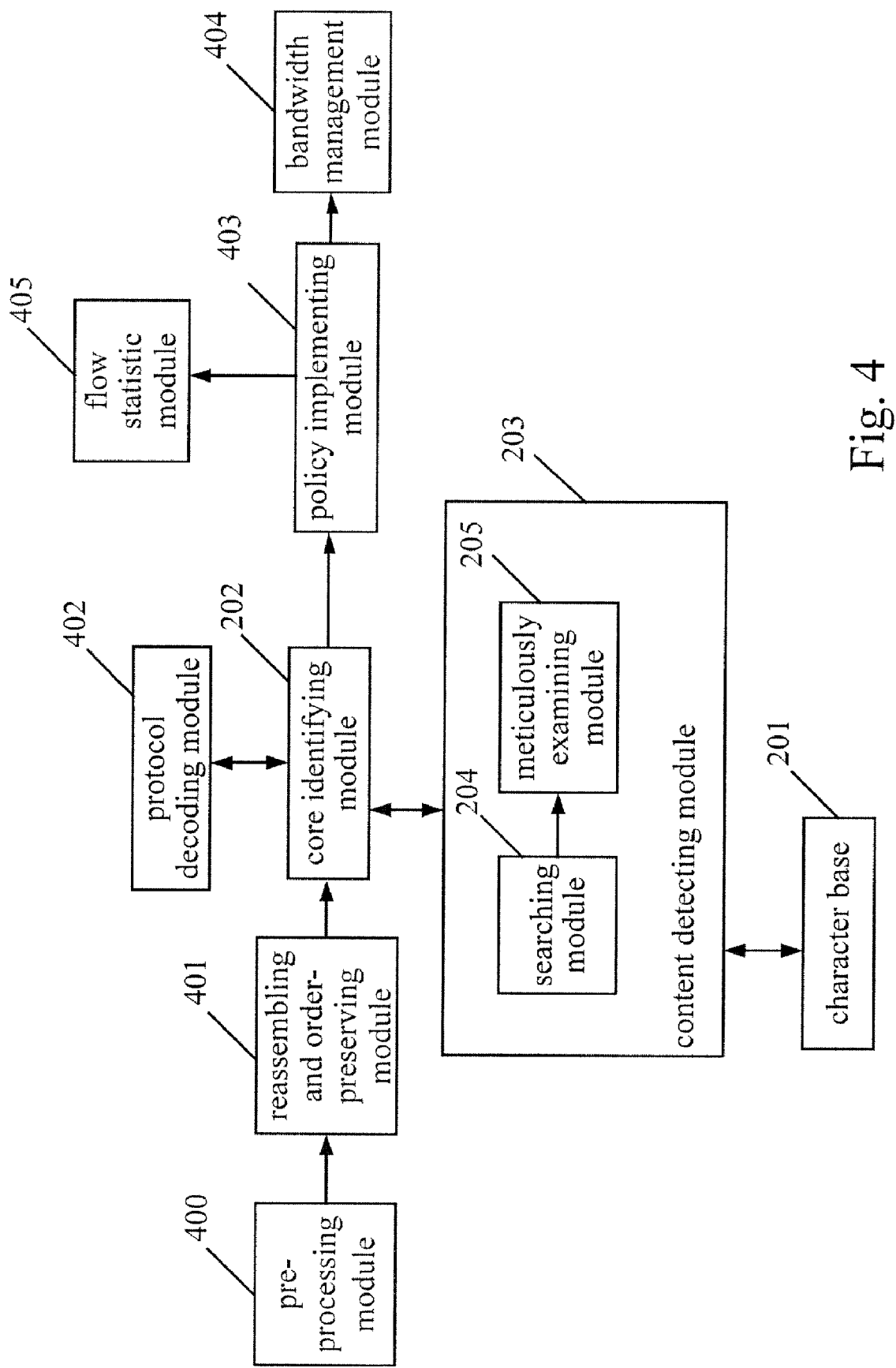
FIG. 4 is a schematic structure diagram illustrating an apparatus for identifying data content according to an embodiment of the present invention.

FIG. 4 is a schematic structure diagram illustrating an apparatus for identifying data content according to an embodiment of the present invention. As shown in FIG. 4, besides the character base 201, the core identifying module 202 and the content detecting module 203, the apparatus further includes: a pre-processing module 400, a reassembling and order-preserving module 401, a protocol decoding module 402, a policy implementing module 403, a bandwidth management module 404 and a flow statistic module 405. The content detecting module 203 includes a searching module 204 and a meticulously examining module 205.

The pre-processing module 400 is configured to pre-process a received packet.

The pre-processing the received packet mainly includes peeling off the packet header of layer 2 and extracting the quintuple.

The reassembling and order-preserving module 401, connected with the pre-processing module 400 and the core identifying module 202, is configured to order-preserve and reassemble the data in the pre-processed packet and then send the data to the core identifying module 202.

The core identifying module 202 establishes a protocol character status machine for a data stream containing the data from the reassembling and order-preserving module 401, and invokes the content detecting module 203 to obtain the characters contained in the data, adjusts the status of the protocol character status machine according to the obtained characters related to a protocol, and then identifies a protocol according to the final status of the protocol character status machine; identifies a service application according to the characters related to a service application; and sends the information of the identified protocol and the information of the identified service application as well as the data to the policy implementing module 403.

An example is hereinafter given to further describe the protocol character status machine. In three handshake processes of TCP, the protocol character corresponding to one handshake is different from the protocol character corresponding to another handshake. After protocol characters corresponding to the action of finishing three handshakes of TCP are obtained, the status of the protocol character status machine is adjusted as finishing three handshakes and establishing the TCP connection, and a preset operation is performed according to the status of the protocol character status machine. For example, when the status of the protocol character status machine is finishing three handshakes and establishing the TCP connection, a preset reset operation is performed. From the above description, it can be seen that the protocol status and protocol layer of both communication sides can be exactly reflected according to the characters related to a protocol and the protocol character status machine. Consequently, the fine-grained identification and proper operation can be supported, the accuracy of the protocol analysis is improved, and the misinformation is reduced.

The process of the core identifying module 202 identifying the protocol and service application according to the obtained characters will be described hereinafter in detail.

The content detecting module 203 includes a searching module 204 and a meticulously examining module 205.

The searching module 204 is configured to perform matching between the contents of the received data from the core identifying module 202 and the characters in the character base 201, obtain the characters contained in the received data, and send the data and the obtained characters to the meticulously examining module 205.

The meticulously examining module 205 is configured to determine whether a meticulous examination is needed after receiving the data and obtained characters from the searching module 204; if the meticulous examination is needed, meticulously examine the data according to the characters in the character base and send an examination result to the core identifying module 202; otherwise, directly send the data stream containing the data and characters from the searching module 204 to the core identifying module 202. The meticulously examination is an optimization for the operation of the searching module 204. For example, for a specific attack, besides fixed characters in the payload, characters of the specific attack may also include part of protocol option characters, e.g., ttl>5; and the protocol option characters of the specific attack need to be detected by the meticulously examining module 205 on the basis of the matching result of the searching module 204. The meticulously examining module 205 not only can detect the protocol option characters, but also can perform a comprehensive intelligent judgment. For another example, when two or more than two attack characters is obtained by performing matching between one piece of data and the characters in the character base, more exact and comprehensive policy and judgment is needed, such as compressively judging frequencies of a specific attack and the appearance order of specific attacks so as to decrease misinformation.

The searching module 204 may be a regular expression searching engine, and the searching engine may be implemented entirely in software, or implemented by Field-Programmable Gate Array (FPGA) or Application Specific Integrated Circuit (ASIC). The searching module 204 also may be hardware for implementing simply String Searching, such as searching by a HASH table. The meticulously examining module 205 may be implemented entirely in software.

For some special protocols, the characters contained in the data cannot be obtained through performing matching unless the data is protocol decoded. For example, the URL part of Hypertext Transfer Protocol (HTTP) may be coded by Unicode, so the data needs to be protocol decoded after the HTTP is identified, and the characters of the decoded data needs to be performed re-matching and re-identifying so as to guarantee the completeness of the content identification. The apparatus in FIG. 4 may further includes a protocol decoding module 402, which is connected with the core identifying module 202 and configured to protocol decode the data. After receiving characters from the meticulously examining module 205 in the content detecting module 203, the core identifying module 202 identifies the characters. If a specific protocol, such as HTTP, is identified, the core identifying module 202 sends the data to the protocol decoding module 402. The protocol decoding module 402 protocol decodes the data, and re-sends the protocol decoded data to the content detecting module 203 so that the content detecting module 203 detects the characters of the data.

The policy implementing module 403 is configured to perform an operation on the data according to the information of the service application and protocol identified by the core identifying module 202. For example, a response, such as resetting Transmission Control Protocol (TCP) connection or recording a log, is generated according to identified service applications, such as attacks or viruses, as well as different actions defined for various service applications.

Additionally, when bandwidth management is needed, the apparatus in FIG. 4 may further include the bandwidth management module 404 connected with the policy implementing module 403. The policy implementing module 403 invokes the bandwidth management module 404 according to a preset policy. The bandwidth management module 404 searches a preset flow classification table according to the identified protocol and obtain a flow classification identifier corresponding to the identified protocol, and performs a preset bandwidth restriction operation according to the flow classification identifier, e.g., restrict the whole bandwidth of the data belonging to the protocol, or restrict the whole bandwidth of a specific user using the protocol, or restrict the bandwidth of one connection of a specific user using the protocol. The bandwidth management module 404 may be a bandwidth scheduling algorithm implemented entirely in software, or may be implemented in hardware.

The apparatus in FIG. 4 further includes a flow statistic module 405 connected with the policy implementing module 403. The policy implementing module 403 invokes the flow statistic module 405 according to a preset policy. The flow statistic module 405 checks whether there is the preset flow classification table according to the identified protocol and a network attribute; if there is the preset flow classification table, update the flow classification table; otherwise, establish a new flow classification table. After the policy implementing module 403 and core identifying module 202 identify the protocols of layer 4 to layer 7, especially a specific action of a certain protocol, the flow statistic module 405 can perform fine-grained application-based flow statistic in stead of the traditional quintuple-based flow statistic.

Figure 5:
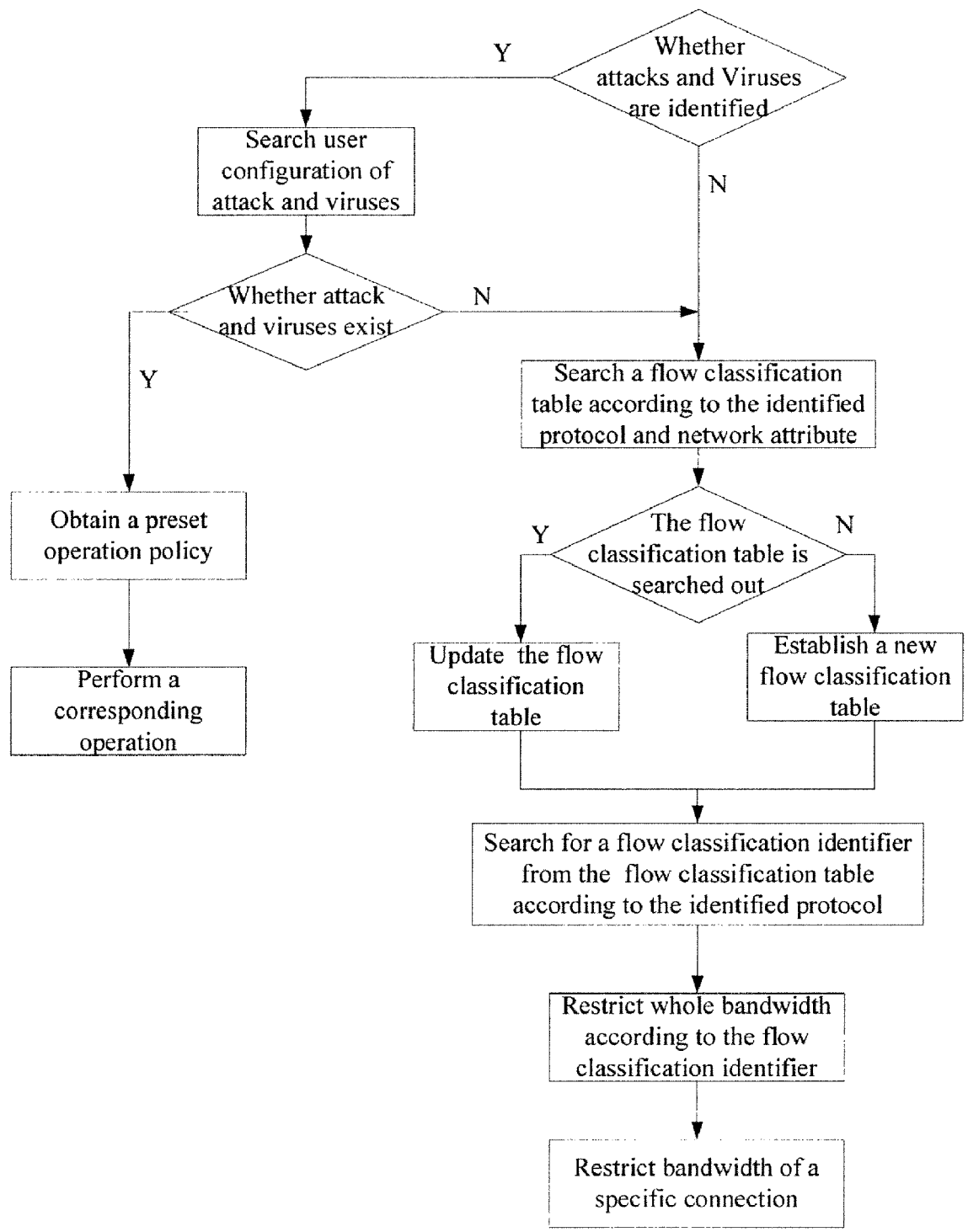
FIG. 5 is a schematic flowchart illustrating the policy implementation of a policy implementing module 403 according to an embodiment of the present invention.

FIG. 5 is a schematic flowchart illustrating the policy implementation of a policy implementing module 403. As shown in FIG. 5, after receiving the data and an identifying result of the data from the core identifying module 202, the policy implementing module 403 determines whether the identifying result includes viruses or attacks. If the identifying result includes viruses or attacks, the policy implementing module 403 searches for an operation policy preset by a user and performs an operation, such as discarding the packet and disconnecting the data connection; otherwise, the policy implementing module 403 invokes the flow statistic module 405, and the flow statistic module 405 searches the preset flow classification table according to the information of the identified protocol and the network attribute. If the preset flow classification table is searched out by the flow statistic module 405, the flow statistic module 405 updates the contents of the flow classification table, e.g., update the byte number of the packet. If the preset flow classification table is not searched out, the flow statistic module 405 establishes a new flow classification table. And then, the policy implementing module 403 invokes the bandwidth management module 405, and the bandwidth management module 405 searches for a flow classification identifier from the preset flow classification table according to the identified protocol, and performs bandwidth restriction according to the flow classification identifier, and restrict the whole bandwidth, service bandwidth and specific connection bandwidth of a user according to the flow classification identifier, the identified protocol, and source IP address in the packet.

The process of identifying the service application and protocol according to the searched-out characters, i.e., the process of the core identifying module 202 identifying the service application contained in the received data and the protocol to which the received data belongs according to the characters from the content detecting module 203 shown in FIG. 2, is described in the following embodiments of the present invention.

A method for identifying a protocol is given firstly. In practice, there is a hierarchy relation among various protocols. A data structure, called a hierarchical protocol tree, is generated according to the hierarchy relation in the embodiment of the present invention.

Figure 6:
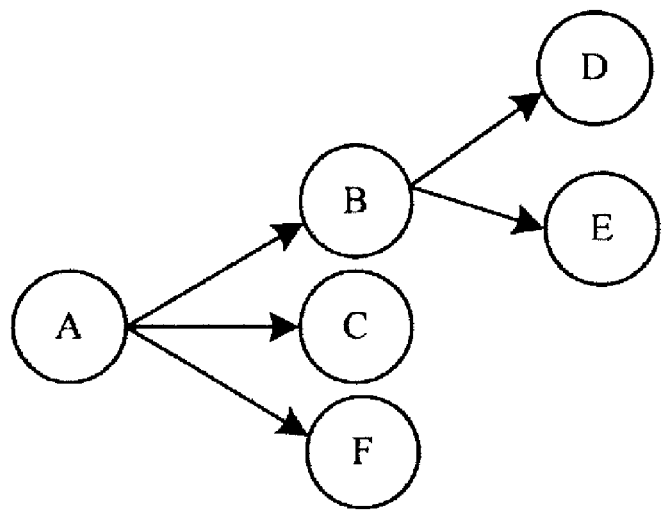
FIG. 6 is a schematic diagram illustrating a hierarchical protocol tree according to an embodiment of the present invention.
Figure 6:
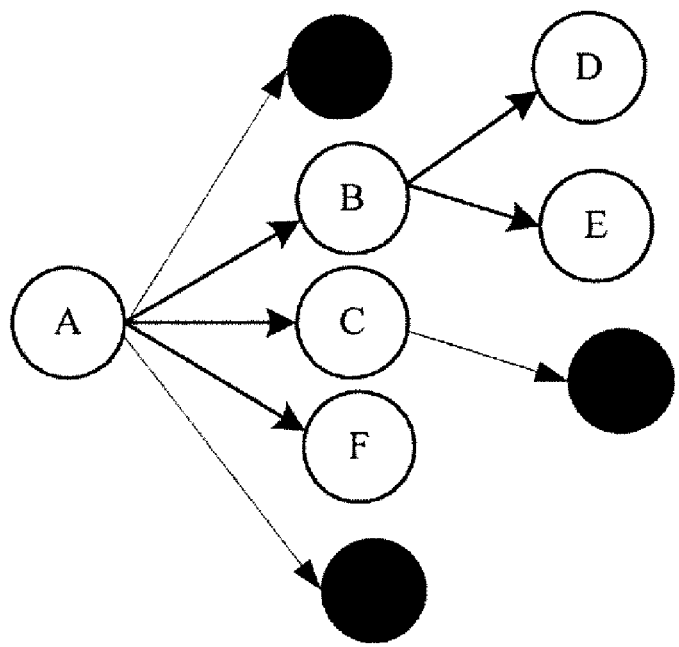

FIG. 6 (a) is a schematic diagram illustrating a hierarchical protocol tree according to an embodiment of the present invention. As shown in FIG. 6 (a), the hierarchical protocol tree includes a root node and more than one other node which hierarchically relates with the root node. Every node stands for a protocol. For every node except for the root node, there is a path from the node to its father node, and there is more than one character in the path. The more than one character corresponds to the protocol which the node stands for. The node may be discovered according to the more than one character after its father node is discovered. For example, in FIG. 6, a node in layer 1, i.e. the root node, is expressed as A and stands for the protocol a; nodes in layer 2 includes B, C and F, respectively standing for protocols b, c and f; and nodes in layer 3 includes D and E, respectively standing for protocols d and e. The protocols a to f are existing protocols, the protocol hierarchy structure of the protocols completely corresponds to the existing protocol hierarchy structure. The path from the root node A to another node includes one or more than one character.

Identifying the protocol corresponding to the characters contained in the received data according to the hierarchical protocol tree includes: matching between the contents of the received data and the characters in the character base is performed and the characters contained in the received data is obtained; starting from the root node, the hierarchical protocol tree is searched layer by layer according to the obtained characters. When the obtained characters includes a character according to which a node lower than the current node can be identified, the protocol which the lower node stands for is identified. The lower node is taken as the current node and the searching process is repeated until that the obtained characters do not include a character according to which a node lower than the current node can be identified any more or the current node is a leaf node. Using the method, not only the protocols can be identified, but also the hierarchy structure among various protocols can be identified, so a better identification effect is brought.

In the embodiment of present invention, a simplified identity serial number is used to stand for a character and one identity serial number is uniquely stands for one character. For example, a numeral may be taken as an identity serial number of a character. In this way, the content detecting module 203 returns to the core identifying module more than one numeral, and the more than one numeral may be expressed as an array.

In the embodiment, the data structure of the hierarchical protocol tree also may be represented by a table. An example is given below.

Suppose in the hierarchical protocol tree shown in FIG. 6 (a), nodes A, B, D, C and F stand for the TCP, HTTP, Bit Torrent (BT) protocol, File Transfer Protocol (FTP) and Voice over Internet Protocol (VOIP) respectively. Also suppose characters corresponding to HTTP of node B include "get" and "post", and identity serial numbers of "get" and "post" are 1 and 2 respectively; characters corresponding to BT protocol of node D include "torrent http", and the identity serial number of "torrent http" is 3; the identity serial number of the character corresponding to FTP of node C is 4; the identity serial number of the character corresponding to VIOP of node F is 5; and the identity serial number of the character corresponding to node E is 6. The hierarchical protocol tree shown in FIG. 6 (a) is expressed as table 1.

TABLE 1

| Father node | Identity serial number of character | Sub node |
|---|---|---|
| A(TCP) | 1 | B(HTTP) |
|  | 2 | B(HTTP) |
|  | 4 | C(FTP) |
|  | 5 | F(VOIP) |
| B(HTTP) | 3 | D(BT) |
|  | 6 | E |

For example, suppose the information of characters in the header of the received packet is " . . . Get . . . torrent http . . . ", the content detecting module 203 performs matching between the contents in the packet with the characters in the character base, and searches out two characters which are "torrent http" and "Get". When identity serial numbers are used to represent the characters, the content detecting module 203 returns the array [1, 3] to the core identifying module 202. The core identifying module 202 searches Table 1 starting from the root node A according to the identity serial number 1 and obtains the sub node B, and then searches Table 1 starting from the node B according to the identity serial number 3 and obtains the sub node D. Thus, when the nodes A->B->D are searched out, the protocols of the packet are identified as TCP->Http->BT.

In order that the protocol and service application are identified according to the characters or identity serial numbers of the characters, the core identifying module 202 needs to store the mapping relation between characters and protocols as well as the mapping relation between characters and service applications. The information of a protocol and a service application may be the name of the protocol and the service application, or other identifiers of the protocol and the service application. According to the above embodiments, the data structure of the hierarchical protocol tree or the identification plane table shown as Table 1 can be used to store the mapping relation between characters and protocols.

The hierarchical protocol tree can be extended to represent the mapping relation between characters and service applications.

FIG. 6 (b) is a schematic diagram illustrating an extended hierarchical protocol tree according to an embodiment of the present invention. As shown in FIG. 6 (b), the extended hierarchical protocol tree also includes a root node and other nodes which hierarchically relate with the root node. Every node stands for a protocol or a service application and is denoted as a circle. The solid circle denotes a service application and the blank circle denotes a protocol. For every node except for the root node, there is a path from the node to its father node, and there is more than one character in the path. The more than one character corresponds to the protocol or service application which the node stands for. The node can be discovered according to the more than one character after its father node is discovered.

Similarly, the extended hierarchical protocol tree in FIG. 6 (b) also can be represented by a table, which will not be described herein.

Additionally, the mapping relation between characters and protocols as well as the mapping relation between characters and service applications can be stored a simple table, in which characters corresponds to protocols or service applications.

When a new protocol or service application needs to be extended, it is only needed to add characters corresponding to the protocol or service application into the character base 202, and modify the hierarchical protocol tree or the identification plane table stored in the core identifying module 202, and then apply the above-mentioned method to identify data content. Therefore, the content identification scheme in the embodiment has good scalability.

The method for identifying the contents of a single packet or single data fragment in data stream is described above. In the content identifying process based on the data stream, more than one character indicating a certain protocol or service application may be distributed in different data fragments of data stream; or the more than one character may be distributed in different packets in a session if the data are not reassembled. Therefore, in practical applications, it is usually to identify the contents of multiple successive data fragments in the data stream, or to identify the contents of multiple successive packets in a session, and then the multiple identification results are taken as an identifying result of the data stream or the session. According to the above method for identifying contents of a single packet, the method and apparatus for identifying session content according to the embodiments of the present invention are described hereinafter. The process of identifying the contents of multiple successive data fragments in the data stream is the same as the method of identifying session content, and the method of identifying session content is taken as an example is described. In the method for identifying session content provided by the present invention, the protocol is identified through the character identification result, and the protocol identification result is taken as a more exact character identification environment, which are described hereinafter respectively.

Figure 7:
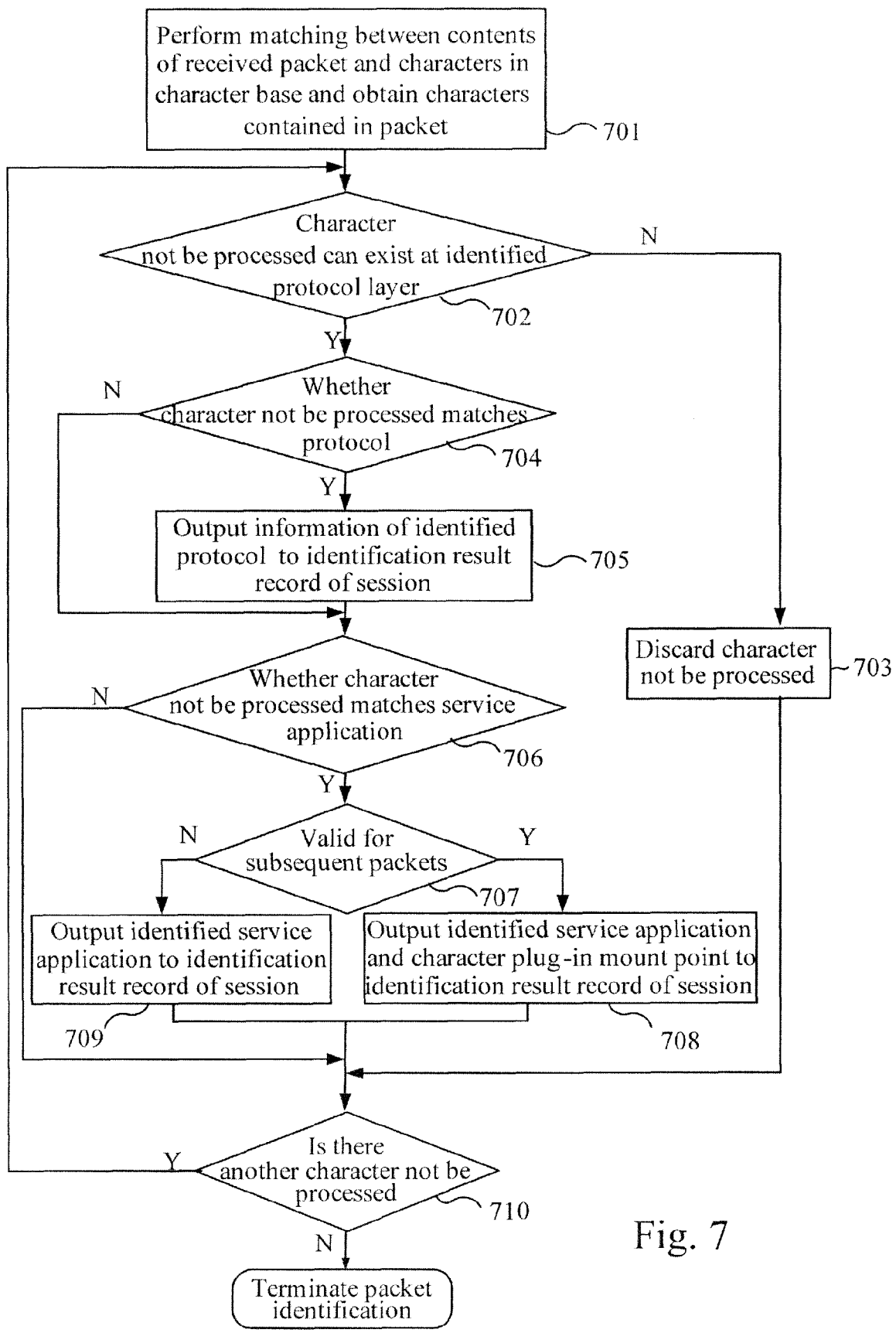
FIG. 7 is a schematic flowchart illustrating a method for identifying session content according to a first embodiment of the present invention.

FIG. 7 is a schematic flowchart illustrating a method for identifying session content according to a first embodiment of the present invention. In FIG. 7, the process of identifying one packet in the session is given. As shown in FIG. 7, the process includes following processes.

Block 701: Characters of the currently received packet are identified, i.e. matching between the contents of the packet and the characters in the character base is performed, and the characters contained in the packet are obtained.

Block 702: For any character which does not be processed in the characters obtained in Block 701, it is determined whether the character which does not be processed can exist at the identified protocol layer of the session to which the packet belongs. If the character can exist, Block 704 is performed; otherwise, Block 703 is performed.

The identified protocol layer is a protocol layer identified through detecting the former packets in the session. The identified protocol layer may have multiple layers. For example, if the HTTP layer is identified at the TCP layer, the process of determining whether the character which does not be processed can exist at the identified protocol layer of the session to which the packet belongs includes: determining whether the character which does not be processed can exist at any one of the TCP layer and HTTP layer.

In the process, the protocol identification result is taken as an environment in which characters are further identified, so some meaningless identification processes can be avoided. For example, when the protocol layer of the packet is the Secure Socket Layer (SSL) protocol, since the SSL protocol is encrypted, the attack characters can not be identified in the session to which the SSL protocol belongs, so it is not necessary to perform the further character identification.

Block 703: The character which does not be processed is discarded and Block 709 is performed.

It can be seen that, because the character which does not be processed is filtered out and discarded according to the identified protocol, the further character identification is avoided, so that the performance of the system is improved. For the characters which need to be further identified, the Blocks 704 to 708, which describe the process of identifying the character which does not be processed, are continuously performed.

In order to identify the character which does not be processed, the apparatus for identifying session content should be able to cognize all protocols and service applications corresponding to all characters respectively, and identify the protocols and service applications through the matching process, which has been described. Specifically, the core identifying module 202 identifies the service application and protocol according to the mapping relation between characters and protocols as well as the mapping relation between characters and service applications. In the embodiment of the present invention, a mapping database is set in the core identifying module 202 and is configured to store the mapping relation between characters and protocols as well as the mapping relation between characters and service applications. Additionally, the mapping database may further store pre-processing functions corresponding to the protocols and character plug-ins corresponding to the service applications, so as to facility the process of subsequent data.

In the embodiment of the present invention, according to the mapping relation between characters and protocols as well as the mapping relation between characters and service applications, the characters are divided into two types.

One type includes characters used for identifying protocols, i.e. the characters corresponding to the protocols. When the type of characters is identified, the identified layer of the session may be extended. Specifically, IP/TCP/UDP/ICMP is taken as a root protocol, and many characters used for identifying new protocols may be defined at every protocol layer. For example, the characters defined at the identified TCP layer may indicate the FTP, Simple Mail Transfer Protocol (SMTP), etc, so when the type of characters is identified through performing matching between the contents of the packet and the characters of the character base, it means that the new FTP and SMTP at the TCP layer are identified. At the identified new protocol, new characters used for identifying protocols also may be defined, so through defining the characters used for identifying protocols layer by layer, the environment and condition for the character identifying can be limited layer by layer. The above process is the same as the conception of the above hierarchical protocol tree.

The other type includes reporting characters, i.e. characters corresponding to service applications. The characters are defined at a specific protocol layer, such as attack characters or characters used for data reassembling and intercepting, and may trigger functions corresponding to the characters to process the packet.

Furthermore, based on the mapping database, the apparatus for identifying session content may identify the protocol and service application corresponding to the character which does not be processed. The mapping database may also record a plurality of pre-processing functions corresponding to the protocols and character plug-ins corresponding to the service applications, so as to be used in the identifying and triggering process. The pre-processing function is triggered by a protocol matching command. The character plug-in is a set of mount codes and is triggered by a service application matching command or a mount point, so as to provide a process function for a report character which triggers the character plug-in. Specifically, the pre-processing function may be a protocol decoding function for protocol decoding the data; and the character plug-in may be a mail parsing plug-in for decoding mail data using Multipurpose Internet Mail Extensions (MIME). In the embodiment, the definition for the type of the character may also be stored in the mapping database, as a part of attributes of the protocols and service applications.

Block 704: It is determined whether the character which does not be processed matches a protocol; if the character which does not be processed matches a protocol, the information of the identified protocol is generated for the session to which the packet belongs and Block 705 is performed; otherwise, Block 706 is performed.

Block 705: The information of the identified protocol is outputted to an identification result record of the session.

Generally, the information of the identified protocol may include a protocol name or identifier in the mapping database. The practical implementing function needed for processing the protocol is statically recorded in a protocol structure in the mapping database and is valid for any packet and session corresponding to the protocol name or identifier.

It can be seen that, through recording the information of the identified protocol and invoking the identified protocol function, the protocol identification mode is not limited to the protocol identification mode based on a port number in the prior art, and the protocols are identified layer by layer according to specific characters, so the flexibility and accuracy of protocol identification is achieved.

Block 706: It is determined whether the character which does not be processed matches a service application; if the character which does not be processed matches the service application, Block 707 is performed; otherwise, Block 709 is performed.

When the character which does not be processed matches a service application, the information of the identified service application also may be generated. The information of the identified service application and the information of the identified protocol generated in Block 704 may be used for the processing of the current packet and is sent to a control center to be used to monitor the packet detecting.

Block 707: It is checked whether the service application is valid for the subsequent packets of the session; if the service application is valid for the subsequent packets of the session, a mount point of the identified character plug-in corresponding to the session is generated in the service application and Block 708 is performed; otherwise, Block 709 is performed.

Block 708: The information of the identified service application and the mount point of the identified character plug-in are outputted to the identification result record of the session, and Block 710 is performed.

Block 709: The information of the identified service application is outputted to the identification result record of the session, and Block 710 is performed.

It should be noted that, not all service applications corresponds to character plug-in mount points respectively. Because a certain character may be applied in several sessions, after a character is processed, if a return code indicates that it is needed to intercept the flow of subsequent packets in the session or process the subsequent packets in the session, a process interface needs to be provided to ensure the validness for the processing of a certain session, and thus the character plug-in mount point is generated for the session in the service application corresponding to the character in the mapping database. If the return code indicates that the pre-identified character is only valid for the current packet, the character plug-in corresponding to the session in the mapping database is invoked directly, and the mount point used to process the subsequent packets need not be generated.

Furthermore, the mount point is outputted to the identification result record. For example, a pointer of the mount point is established in the identification result record, the mount code corresponding to the session in the mapping database can be triggered without detecting the subsequent packets, so that the continuous processing of the packets can be implemented.

In Blocks 704 to 709, it is detected whether the character which does not be processed matches the protocol before whether the character which does not be processed matches the service application is detected. However, the skilled in the art can understand that the technical scheme of the present invention can be implemented as long as the type of the character which does not be processed is identified, and has no relation with the detecting order. In other words, the processes of Blocks 704 to 709 may be replaced with any process which can identify the type of the character which does not be processed and perform the mount operation corresponding to the session.

Block 710: It is checked whether there is another character which does not be processed; if there is another character which does not be processed, Block 702 is performed on the character which does not be processed; otherwise, the content identification of the current packet is terminated.

It can be seen from the method for identifying session content shown in FIG. 7 that, by using characters to exactly identify the protocol, flexibility and accuracy of the protocol identification are ensured. By taking the protocol identification result as the environment in which characters are identified, the accuracy of the character identification and the performance of the system are also improved.

The present invention also provides a method for identifying a session according to a second embodiment. According to the first embodiment shown in FIG. 7, if the character which does not be processed matches a protocol in Block 704, the method further includes the process of triggering a pre-processing function corresponding to the protocol to process the packet; if the character which does not be processed matches a service application in Block 706, the method further includes the process of triggering a character plug-in corresponding to the service application to process the packet, so that an complete detecting-processing flow is implemented.

However, in the above processes, until the packet is detected, the characters are identified one by one. If the mount point stored in the identification result record of the session is invoked before the characters are identified, the process of re-identifying the processed character can be avoided, so that the system performance can be further improved. Hence in the second embodiment, before the process of identifying the characters in the Block 701 is performed, the method further includes: invoking the identification result record of the session, triggering the pre-processing function corresponding to the protocol and character plug-in corresponding to the service application through the identification result record, and processing the packet.

In order to save the system resources, the present invention also provides a method for identifying a session according to a third embodiment. The method further includes: after the current packet is received, determining whether it is needed to continue identifying the session to which the current packet belongs. For example, if data length of a certain session exceeds the longest detecting length, or the identified protocol is encrypted, the session need not be identified any more.

In order to determine whether it is needed to continue the session identifying, it may be defined that the session identifying is not continued when a certain protocol or service application is identified. Or, a data length of the session which needs to be detected may be defined, and thus after the characters of the packet are identified, the length of the detected stream in the session to which the packet belongs is calculated. If the length of the detected stream is longer than the preset detected length, the session identifying is terminated. The preset detected length may be the sum of lengths of all or part of characters defined by the corresponding protocols in the identification result record.

For example, the protocol identification or service application identification may be integrated into the scheme of calculating the detected stream in the session. If a protocol is encrypted, no character is defined for the protocol, so the longest detected length of all characters of the protocol is 0. Therefore, once the protocol is identified, the session is terminated.

Or, the longest length of all characters at the identified top layer in the session is defined as the length of the session detecting stream. If the detected length is longer than the length needing to be detected, the corresponding session identifying is terminated. In another example, if there is no character at the identified top layer, the length needing to be detected is 0, so it is needed to continue the session identifying and a command may be issued to terminate the session identifying.

In the third embodiment, whether the session identifying continues is determined dynamically by comparing the length of the detected stream with the length of the session needing to be detected, so that the identifying performance is greatly improved.

In the embodiment shown in FIG. 4, according to the number of fixed bytes (such as 2 k, 4 k, etc), the reassembly and order-preserving are performed simultaneously, and then the characters are identified. In this way, the reassembly process is very rigidity and the reassembly result can not reflect the fact of the data. However, in the fourth embodiment, because the data stream interception and reassembly are effectively performed by means of the identification result of the protocol and service application, the method for identifying session content, which integrates the protocol identification, service application identification and flow interception, is provided. In the fourth embodiment, triggering the identified protocol processing function and/or the identified character plug-in to process the packet includes: checking whether the packet needs to be reassembled and reserved, reassembling and caching the packet and the former packets in the session if the packet needs to be reassembled and reserved, and detecting the next packet in the session.

It can be seen that, in the fourth embodiment the reassembly may be performed when the identified protocol processing function and character plug-in are triggered or after the protocol information and plug-in mount point corresponding to the session are generated. The reassembly is not necessary to be performed during the order-preserving, which is one key of the fourth embodiment.

The order-preserving in the fourth embodiment also can be implemented using the technical scheme in the prior art and can be performed after the packet is received. Generally, only after the order-preserving and reassembly, the character identifying, i.e. the character base matching, can be accurate and have no omission. Since the cost of the order-preserving and reassembly is relatively high, when the longest detected length of a certain session is exceeded, the session need not be identified any more and the order-preserving function can be closed. Furthermore, whether the order-preserving function is closed can be considered as a guideline. Whether the order-preserving function of the session to which the packet belongs is closed may be determined firstly; if the order-preserving function is closed, the order-preserving and character identifying of the packet are terminated; if the order-preserving function is opened, the packet is stored, the identification result record of the session is invoked and the packet is detected. According to the specifically condition of processing the protocol and implementing the mount point, it is determined when the reassembly is performed.

Figure 8:
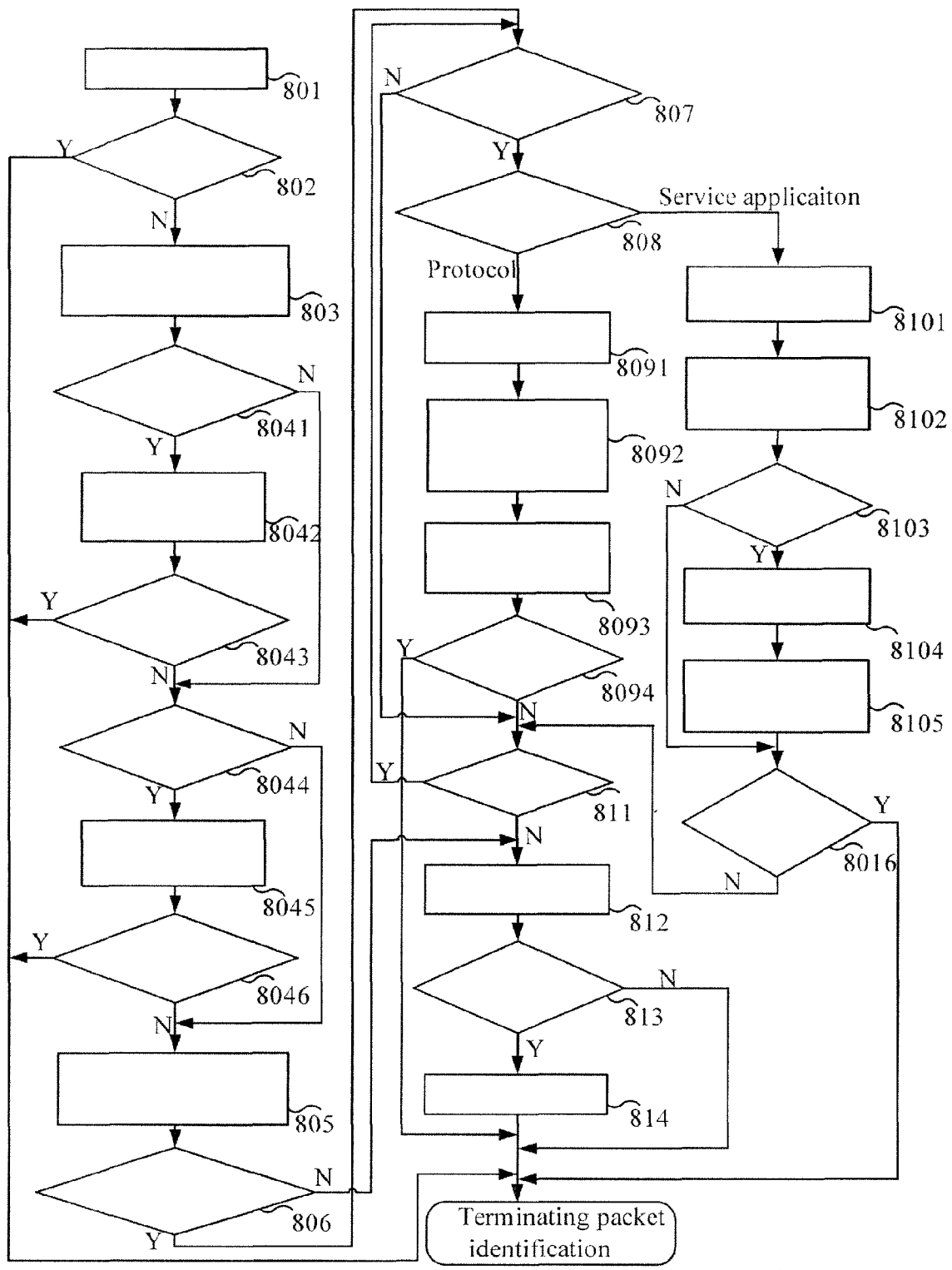
FIG. 8 is a schematic flowchart illustrating a method for identifying session content according to a fifth embodiment the present invention.

In the fourth embodiment, the reassembly at the application layer is parted from the TCP order-preserving, so that the reassembly flexibility is improved. The service application identification, protocol identification and application reassembly are combined through the reassembly of the protocols and service applications, so that the reassembly accuracy is improved. FIG. 8 is a schematic flowchart illustrating a method for identifying session content according to a fifth embodiment of the present invention. The methods for identifying session content in the first embodiment to the fourth embodiment are considered synthetically in the fifth embodiment. The method includes following processes.

Block 801: The current packet is received.

Block 802: It is determined whether the order-preserving function of the session to which the packet belongs is closed. If the order-preserving function of the session to which the packet belongs is closed, it is indicated that the packet need not be detected any more, the session identification is terminated; otherwise, proceed to Block 803.

Block 803: The packet is order-preserved and the identification result record of the session to which the packet belongs is invoked.

Block 804: The pre-processing function of the identified protocol and/or the identified character plug-in is triggered through the identification result record to process the packet. The process specifically includes:

Block 8041: It is checked whether the identification result record includes the information of the identified protocol; if the identification result record includes the information of the identified protocol, Block 8041 is performed; otherwise, Block 8044 is performed.

Block 8042: The pre-processing function of the identified protocol is invoked to process the packet.

Block 8043: It is checked whether the process result includes reassembling and reserving the packet; if the process result includes reassembling and reserving the packet, the packet and the former packet in the session is reassembled and cached, and detecting the packet is terminated and the next packet is detected; otherwise, Block 8044 is performed.

Block 8044: It is checked whether the identification result record includes a character plug-in mount point; if the identification result record includes a character plug-in mount point, Block 8045 is performed; otherwise, Block 805 is performed.

Block 8045: The mount code corresponding to the identified character plug-in mount point is invoked to process the packet.

Block 8046: It is checked whether the process result includes reassembling and reserving the packet; if the process result includes reassembling and reserving the packet, the packet and the former packet in the session is reassembled and cached, and detecting the packet is terminated and the next packet is detected; otherwise, Block 805 is performed.

Block 805: The characters contained in the current packet are identified, i.e. matching between the contents of the packet and the characters in the character base is performed, and the characters contained in the packet are obtained.

Block 806: It is determined whether a character which does not be processed is identified; if a character which does not be processed is identified, Block 807 is performed; otherwise, Block 812 is performed.

Block 807: It is determined whether the character which does not be processed can exist at the identified protocol layer of the session to which the packet belongs; if the character which does not be processed can exist at the identified protocol layer of the session to which the packet belongs, Block 808 is performed; otherwise, the character which does not be processed is discarded or ignored and Block 811 is performed.

Block 808: The type of the character which does not be processed is identified; when the character which does not be processed matches a protocol in the mapping database, Block 809 is performed; when the character which does not be processed matches a service application in the mapping database, Block 810 is performed.

Block 809: A process is performed according to the identified protocol. The process specifically includes:

Block 8091: The information of the identified protocol corresponding to the session is generated, and a new protocol is extended at the current protocol layer of the packet.

Block 8092: The information of the identified protocol is outputted to the identification result record of the session.

Block 8093: The pre-processing function corresponding to the identified protocol in the mapping database is invoked according to a matching command to process the packet. The skilled in the art can understand that the description order of the embodiment is for the sake of describing the present invention clearly and the present invention is not limited to the description order of the above processes. The process of Block 8093 also may be implemented before the process of Block 8091 and the technical effect of the present invention will not be affected.

Block 8094: It is checked whether the process result includes reassembling and reserving the packet; if the process result includes reassembling and reserving the packet, the packet and the former packet in the session are reassembled and cached, and detecting the packet is terminated and the next packet is detected; otherwise, Block 811 is performed.

Block 810: A process is performed according to the identified service application. The process specifically includes Blocks 8101 to 8106.

Block 8101: The information of the identified service application corresponding to the session, such as the identifier of the service application in the mapping database. The information of the identified service application may be used by the system to control the state of the session identifying.

Block 8102: The character plug-in mount point corresponding to the service application in the mapping database is invoked according to the matching command to process the packet.

Block 8103: It is checked whether the service application is valid for the subsequent packets in the session; if the service application is valid for the subsequent packets in the session, Block 8104 is performed; otherwise, Block 8106 is performed.

Block 8104: The identified character plug-in mount point for the session is generated at the service application in the mapping database, i.e. an interface is provided for the session to invoke the service application continuously.

Block 8105: The identified character plug-in mount point is outputted to the identification result record of the session.

Block 8106: It is checked whether the process result includes reassembling and reserving the packet; if the process result includes reassembling and reserving the packet, the packet and the former packet in the session are reassembled and cached, detecting the packet is terminated and the next packet is detected; otherwise, Block 811 is performed.

Those skilled in the art can understand that the order of Blocks 8101 to 8105 is not limited as shown in FIG. 8. For example, the order may be: Blocks 8102, 8106, 8101, 8103, 8104 and 8105.

Block 811: It is checked whether there is another character which does not be processed; if there is another character which does not be processed, Block 807 is performed for the character which does not be processed; otherwise, Block 812 is performed.

Block 812: The length of the detected stream in the session to which the packet belongs is calculated.

Block 813: It is checked whether the length of the detected stream in the session to which the packet belongs is longer than the detected length of all the characters; if the length of the detected stream in the session to which the packet belongs is longer than the detected length of all the characters, Block 814 is performed; otherwise, the packet detecting is terminated and the next packet is detected.

Block 814: The order-preserving function of the session is closed and the packet detecting is terminated.

In Blocks 812 to 814, the length of the detected stream in the session is calculated and compared with the detected length of all the characters. If the length of the detected stream in the session is longer than the detected length of all the characters, the order-preserving function of the session is closed. Since in the embodiment of the present invention, whether the order-preserving function is closed determines whether the packet detecting is continued, the skilled in the art can understand that Blocks 812 to 814 not only may be performed after the Block 811, but also may be performed at any time during the session identifying process or be performed at the same time with another operation.

The skilled in the art also can understand that all of or part of the above processes can be implemented by correlative hardware which is instructed by a program, and the program may be stored in a readable storage medium of a computer. When being executed, the program includes following processes.

Characters of the received packet which needs to be detected are detected; when a character which does not be processed is identified, it is identified whether the character which does not be processed can exist at the identified protocol layer of the session to which the packet belongs; if the character which does not be processed can exist at the identified protocol layer of the session to which the packet belongs, following processes is performed; otherwise, the character which does not be processed is discarded.

The character which does not be processed is identified. When the character which does not be processed matches a protocol, the information of the identified protocol corresponding to the session is generated. When the character which does not be processed matches a service application and is valid for the subsequent packets in the session, a mount point of the identified character plug-in corresponding to the session is generated at the service application.

The information of the identified protocol and the mount point of the identified character plug-in are outputted to the identification result record of the session.

According to the above embodiments, a schematic structure diagram illustrating an apparatus for identifying session content according to the present invention is given as follows.

Figure 9:
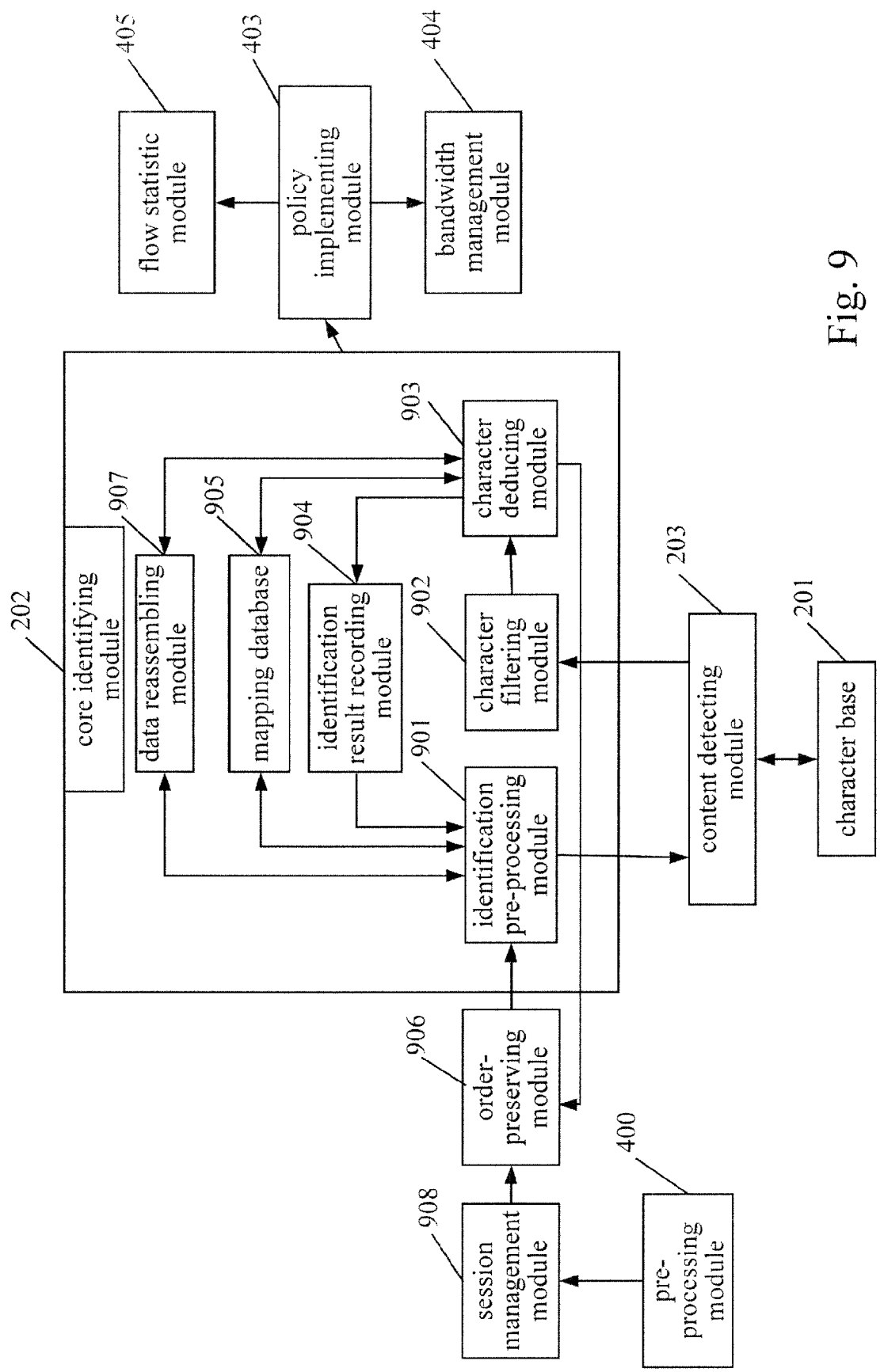
FIG. 9 is a schematic structure diagram illustrating an apparatus for identifying session content according to an embodiment of the present invention.

FIG. 9 is a schematic structure diagram illustrating an apparatus for identifying session content according to an embodiment of the present invention. As shown in FIG. 9, the differences of the apparatus in FIG. 9 and the apparatus in FIG. 4 includes: when contents of a session or data stream is identified, the function of the core identifying module 202 is enhanced, more detailed internal structure of the core identifying module 202 is given, only the data order-preserving operation is performed before the content identification, and the data reassembly is performed during the content identification. The apparatus in FIG. 9 includes all modules in FIG. 4 except for the reassembling and order-preserving module 401 and the protocol decoding module 402. The apparatus further includes a session management module 908 and an order-preserving module 906. The core identifying module 202 includes an identification pre-processing module 901, a character filtering module 902, a character deducing module 903, an identification result recording module 904, a mapping database 905 and a data reassembling module 907.

The session management module 908 is configured to perform the session management of the packet from the pre-processing module 400, e.g., divide the data stream according to quintuple, and manage, such as half-connect, connect and age, the status of the data stream.

The order-preserving module 906 is configured to order-preserve the packet from the session management module 908 and send the order-preserved packet to the identification pre-processing module 901.

The identification pre-processing module 901 is configured to search the identification result recording module 904 for the information of the identified protocol and the character plug-in mount points of the session, trigger the pre-processing function and the character plug-in mount code in the mapping database to process the packet, and then send the pre-processed packet to the content detecting module 203 to perform character matching. If the identification result recording module 904 does not include the information of the identified protocol and the character plug-in mount points, directly send the packet to the content detecting module 203.

The content detecting module 203 performs matching between the packet from the pre-processing module and the characters in the character base 201, obtains the characters contained in the packet, and sends the obtained characters to the character filtering module 902.

The character filtering module 902 is configured to filter out characters which impossibly exist at the identified protocol layer from the characters in the content detecting module 203, and send the remainder characters to the character deducing module 903.

The character deducing module 903 is configured to receive the characters from the character filtering module 902, search the mapping database 905 for the information of the protocol and the information of the service application corresponding to the received characters, and output the searched-out information of the protocol and the character plug-in mount point of the service application to the identification result recording module 904; and further configured to trigger the pre-processing function corresponding to the identified protocol and the character plug-in corresponding to the identified service application in the mapping database according to a character matching command or a mount point to process the data.

The identification result recording module 904 is configured to store the information of the identified protocol and/or the information of the identified service application and/or the character plug-in mount points of the identified service applications.

In order to control the status of the session identifying, the character deducing module 903 is further configured to send the information of the identified service application and the information of the identified protocol to a control center (not shown in FIG. 9).

The mapping database 905 is configured to store the mapping relation between characters and protocols as well as the mapping relation between characters and service applications; and further store pre-processing functions corresponding to the protocols and character plug-ins corresponding to the service applications.

The character deducing module 903 is further configured to check whether the length of the detected data in the session to which the current packet belongs is longer than a preset length after the protocol and/or service application corresponding to the current packet is identified; send a command of closing the order-preserving function to the order-preserving module 906 if the length of the detected data in the session to which the current packet belongs is longer than a preset length.

The data reassembling module 907, connected with the identification pre-processing module and the character deducing module, is configured to reassemble and cache the received data after receiving a reassembling and reserving command from the identification pre-processing module or the character deducing module, so that the reassembling and caching function of data fragments are implemented. The identification pre-processing module 901 is further configured to determine whether the data needs to be reassembled and reserved after pre-processing the received data; if the data needs to be reassembled and reserved, send the data to the data reassembling module 907 and issue the reassembling and reserving command to the data reassembling module 907; otherwise, send the data to the content detecting module 203. The character deducing module 903 is further configured to determine whether the data needs to be reassembled and reserved after triggering the pre-processing function and/or character plug-in in the mapping database according to the identification result to process the data; send the data to the data reassembling module 907 and issue the reassembling and reserving command to the data reassembling module 907 if the data needs to be reassembled and reserved.

In the embodiment shown in FIG. 9, the character filtering module 902 takes the protocol identification result as the character identifying environment, so that the accuracy of the character identifying and the performance of the system are improved. The character deducing module 903 identifies and extends the protocol by character identifying, so that the flexibility and accuracy of protocol identification are ensured. The identification pre-processing module 901 invokes the information in the identification result recording module 904 and pre-processes the packet before the matching between the packet and the character base is performed, so as to avoid identifying the processed characters repeatedly and improve the system performance. The idea of parting the order-preserving from reassembling can be seen from the order-preserving module 906 which only performs the order-preserving operation and does not perform the reassembling operation. The reassembling operation is performed by the data reassembling module 907 according to the result of implementing the plug-in mount code. It can be seen that, by the order-preserving module 906 and the data reassembling module 907, the reassembly at the application layer is parted from the order-preserving, so that the reassembly flexibility is improved. Additionally, the service application identification, protocol identification and application reassembly are combined according to the reassembling of the protocols and service applications, so as to improve the reassembly accuracy.

The above embodiments are only used to describe the technical schemes in the present invention, and are not used for limiting the protection scope thereof. Although the present invention is explained in detail with reference to the preferred embodiments, it should be understood by the skilled in the art that any modification or equivalent replacement made without departing from the spirit of the present invention should be covered by the protection scope of the present invention.

What is claimed is:

1. A method for identifying data content, comprising:
    establishing, by a data processing device, a character base, wherein the character base stores characters corresponding to various service applications and protocols;
    performing, by the data processing device, matching between contents of currently received data and the characters in the character base, and obtaining characters contained in the currently received data; and
    identifying, by the data processing device, at least one of a service application and a protocol corresponding to the characters contained in the currently received data according to a mapping relation between characters and protocols as well as a mapping relation between characters and service applications;
    wherein identifying at least one of the service application and the protocol corresponding to the characters contained in the currently received data comprises,
    determining whether each character contained in the currently received data can exist at an identified protocol layer of former data in a session to which the currently received data belongs, if the character can exist at the identified protocol layer of the former data in the session to which the currently received data belongs, identifying the service application or protocol corresponding to the character, otherwise, ignoring the character.

2. The method of claim 1, before performing the matching between the contents of the currently received data and the characters in the character base, further comprising:
    pre-processing, by the data processing device, the currently received data, and reassembling and order-preserving the currently received data.

3. The method of claim 1, after a preset protocol corresponding to the characters contained in the currently received data is identified, further comprising:
    protocol decoding, by the data processing device, the currently received data according to the identified preset protocol;
    performing re-matching between the protocol decoded data and the characters in the character base;
    obtaining characters contained in the protocol decoded data; and
    identifying at least one of a service application and a protocol corresponding to the characters contained in the protocol decoded data.

4. The method of claim 1, wherein identifying at least one of the service application and the protocol corresponding to the characters contained in the currently received data comprises:
    examining the currently received data when the characters contained in the currently received data includes a specific character and further obtaining characters; and
    identifying at least one of the service application and the protocol corresponding to the further obtained characters.

5. The method of claim 1, after identifying at least one of the service application and the protocol corresponding to the characters contained in the currently received data, further comprising:
    performing, by the data processing device, a preset operation for the currently received data according to at least one of the identified service application and the identified protocol.

6. The method of claim 5, before performing the matching between the contents of the currently received data and the characters in the character base, further comprising:
    establishing and maintaining, by the data processing device, a protocol character status machine of the currently received data; and
    wherein performing the preset operation for the currently received data according to at least one of the identified service application and the identified protocol comprises,
    when the protocol corresponding to the characters contained in the currently received data is identified, adjusting status of the protocol character status machine according to the identified protocol and performing the preset operation according to the status of the protocol character status machine.

7. The method of claim 5, wherein performing the preset operation for the currently received data according to at least one of the identified service application and the identified protocol comprises:

searching a preset flow classification table according to the identified protocol, obtaining a flow classification identifier corresponding to a data stream containing the currently received data, and performing a preset bandwidth restriction operation according to the flow classification identifier.

8. The method of claim 7, before searching the preset flow classification table, further comprising:

checking, by the data processing device, whether there is the preset flow classification table according to the identified protocol and a network attribute; if there is the preset flow classification table, updating the flow classification table, searching the updated flow classification table, and obtaining the flow classification identifier; if there is not the preset flow classification table, establishing a new flow classification table, searching the new flow classification table and obtaining the flow classification identifier.

9. The method of claim 1, wherein the mapping relation between characters and protocols as well as the mapping relation between characters and service applications is expressed by a preset hierarchical protocol tree;

the hierarchical protocol tree comprises a root node and more than one node which hierarchically relates with the root node;

every node stands for a protocol or a service application, and a hierarchy relation among the nodes is the same as a hierarchy relation among the protocols or service applications which the nodes stand for respectively; and for every node except for the root node, there is more than one character in a path from the node to a father node of the node, and the more than one character corresponds to the protocol or service application which the node stands for.

10. The method of claim 9, wherein identifying at least one of the service application and the protocol corresponding to the characters contained in the currently received data comprises:

searching the hierarchical protocol tree layer by layer starting from the root node; wherein when obtained characters includes a character according to which a node lower than a current node is discovered, the protocol or service application which the lower node stands for is identified.

11. The method of claim 1, after identifying at least one of the service application and the protocol corresponding to the character, further comprising:

outputting, by the data processing device, information of the protocol to an identification result record of the session to which the currently received data belongs when the protocol corresponding to the character is identified; and outputting, by the data processing device, a character plug-in mount point corresponding to the service application to the identification result record of the session to which the currently received data belongs when the service application corresponding to the character is identified.

12. The method of claim 11, after the protocol corresponding to the character is identified, further comprising:

invoking, by the data processing device, a pre-processing function corresponding to the protocol to process the currently received data; and after the service application corresponding to the character is identified, further comprises, invoking, by the data processing device, a character plug-in corresponding the service application to process the currently received data.

13. The method of claim 12, before performing the matching between the contents of the currently received data with the characters in the character base, further comprising:

searching, by the data processing device, an identification result record of former data in the session to which the currently received data belongs; and processing the currently received data according to information recorded in the identification result record.

14. The method of claim 13, wherein processing the currently received data according to the information recorded in the identification result record comprises:

invoking the pre-processing function corresponding to the protocol if the identification result record includes the information of the protocol to process the currently received data; and invoking a character plug-in corresponding to a mount point if the identification result record includes the character plug-in mount point to process the currently received data.

15. The method of claim 14, wherein the method comprises, before processing the currently received data according to the information in the identification result record of former data in the session to which the currently received data belongs:

order-preserving, by the data processing device, the currently received data;

after processing the currently received data according to the information in the identification result record, identifying at least one of the service application and the protocol according to the characters contained in the currently received data and invoking at least one of the pre-processing function and the character plug-in to process the currently received data; and checking, by the data processing device, whether a process result of the currently received data includes reassembling and reserving the currently received data; if the process result of the currently received data includes reassembling and reserving the currently received data, reassembling and caching the currently received data and the former data in the session to which the currently received data belongs, and terminating the process of identifying data content.

16. The method of claim 15, if the process result of the currently received data does not includes reassembling and reserving the currently received data and the protocol is identified, further comprising:

checking, by the data processing device, whether there is another character which does not be processed; if there is not another character which does not be processed, calculating a detected data length of the session;

checking, by the data processing device, whether the detected data length of the session to which the currently received data belongs is longer than a preset length; if the detected data length of the session to which the currently received data belongs is longer than the preset length, closing an order-preserving function of the session and terminating processing the currently received data; otherwise, directly terminating processing the currently received data; and before order-preserving the currently received data, the method further comprises,
determining, by the data processing device, whether the order-preserving function of the session to which the currently received data belongs is closed, if the order-preserving function of the session to which the currently received data belongs is closed, terminating processing the currently received data; otherwise, order-preserving the currently received data.

17. A data processing device for identifying data content, comprising a character base, a core identifying module and a content detecting module, wherein
the character base is configured to store characters corresponding to various service applications and protocols;
the core identifying module is configured to send received data to the content detecting module, and identify at least one of a service application and a protocol corresponding to characters returned by the content detecting module according to a mapping relation between characters and protocols as well as a mapping relation between characters and service applications; and
the content detecting module is configured to perform matching between contents of the received data from the core identifying module and the characters in the character base, obtain characters contained in the received data and return the characters contained in the received data to the core identifying module,
wherein the core identifying module comprises a mapping database and a character deducing module,
where the mapping database is configured to store the mapping relation between characters and protocols as well as the mapping relation between characters and service applications, and
where the character deducing module is configured to identify at least one of the service application and the protocol corresponding to the characters returned by the content detecting module according to the mapping relations stored in the mapping database; and
wherein the core identifying module further comprises an identification result recording module and an identification pre-processing module,
where the identification result recording module, connected with the character deducing module, is configured to store at least one piece of information of the protocol, information of the service application and character plug-in mount points of the service applications identified by the character deducing module,
where the mapping database is further configured to store pre-processing functions corresponding to protocols and character plug-ins corresponding to service applications, and
where the identification pre-processing module is configured to search the identification result recording module for the information of the identified protocol of a session to which the received data belongs and the character plug-in mount points of the service application, trigger a pre-processing function corresponding to the identified protocol and a character plug-in mount code in the mapping database to pre-process the received data, and then send the pre-processed data to the content detecting module.

18. The data processing device of claim 17, further comprising: a pre-processing module and a reassembling and order-preserving module;
the pre-processing module is configured to pre-process the received data and send the pre-processed data to the reassembling and order-preserving module;
the reassembling and order-preserving module, connected with the pre-processing module and the core identifying module, is configured to order-preserve and reassemble the pre-processed data and send the order-preserved and reassembled data to the core identifying module.

19. The data processing device of claim 17, wherein the content detecting module comprises:
a searching module and an examining module;
the searching module is configured to perform the matching between the contents of the data from the core identifying module and the characters in the character base and obtain the characters contained in the received data; and
the examining module is configured to examine the characters contained in the received data according to a matching result from the searching module, and send a examination result to the core identifying module.

20. The data processing device of claim 17, further comprising:
a policy implementing module, configured to receive the received data and receive at least one piece of information of the identified service application and information of the identified protocol from the core identifying module, and perform an operation on the received data according to at least one piece of the information of the identified service application and the information of the identified protocol.

21. The data processing device of claim 20, further comprising a bandwidth management module connected with the policy implementing module,
where the policy implementing module is configured to receive the received data and the identified protocol from the core identifying module, and invoke the bandwidth management module, and
where the bandwidth management module is configured to search a preset flow classification table according to the identified protocol, obtain a flow classification identifier and perform a preset bandwidth restriction operation according to the flow classification identifier when invoked by the policy implementing module.

22. The data processing device of claim 21, further comprising a flow statistic module connected with the policy implementing module,
where the policy implementing module is configured to receive the received data and the identified protocol from the core identifying module, and invoke the flow statistic module, and
where the flow statistic module is configured to check whether there is the preset flow classification table according to the identified protocol and a network attribute, if there is the preset flow classification table, update the flow classification table; otherwise, establish a new flow classification table.

23. The data processing device of claim 17, further comprising a protocol decoding module connected with the core identifying module,
where the core identifying module is configured to identify the characters after receiving the characters returned by the content detecting module, if a specific protocol is identified, send the received data to the protocol decoding module and re-send the data returned from the protocol decoding module to the content detecting module, and
where the protocol decoding module is configured to protocol decode the data from the core identifying module and return the protocol decoded data to the core identifying module.

24. The data processing device of claim 17, wherein the core identifying module further comprises a character filtering module connected with the content detecting module and the character deducing module,
    where the character filtering module is configured to filter out characters which cannot exist at an identified protocol layer from characters from the content detecting module, and send remainder characters to the character deducing module.

25. The data processing device of claim 17, wherein the character deducing module is further configured to trigger the pre-processing function corresponding to the protocol in the mapping database when the protocol corresponding to the characters is identified to process the data and to trigger the corresponding character plug-in in the mapping database when the service application corresponding the characters is identified to process the received data.

26. The data processing device of claim 25, further comprises an order-preserving module; wherein the core identifying module further comprises a data reassembling module,
    where the order-preserving module is configured to order-preserve the received data and send the order-preserved data to the identification pre-processing module in the core identifying module,
    where the data reassembling module, connected with the identification pre-processing module and the character deducing module, is configured to reassemble and cache the received data according to a reassembling and reserving command from the identification pre-processing module and the character deducing module,
    where the identification pre-processing module is further configured to determine whether the received data needs to be reassembled and reserved after pre-processing the received data, if the received data needs to be reassembled and reserved, send the received data to the data reassembling module and issue the reassembling and reserving command to the data reassembling module; otherwise, send the received data to the content detecting module, and
    where the character deducing module is further configured to determine whether the received data needs to be reassembled and reserved after triggering at least one of the pre-processing function and the character plug-in in the mapping database to process the data, if the received data needs to be reassembled and reserved, send the received data to the data reassembling module and issue the reassembling and reserving command to the data reassembling module.

27. The data processing device of claim 26, further comprising a pre-processing module and a session management module,
    where the pre-processing module is configured to pre-process the received data and send the pre-processed data to the session management module, and
    where the session management module is configured to perform a session management operation on the received data and send the data to the order-preserving module.

28. The data processing device of claim 26, wherein the character deducing module is further configured to check whether the detected data length in the session to which the received data belongs is longer than a preset length after at least one of the protocol and the service application corresponding to the characters is identified; if the detected data length in the session to which the received data belongs is longer than the preset length, send a command of closing the order-preserving function to the order-preserving module.

\* \* \* \* \*